July 13, 1937. T. W. BEHAN 2,086,931
SPEED REDUCTION AND MOTION TRANSLATING MECHANISM
Filed Dec. 1, 1934 3 Sheets-Sheet 2
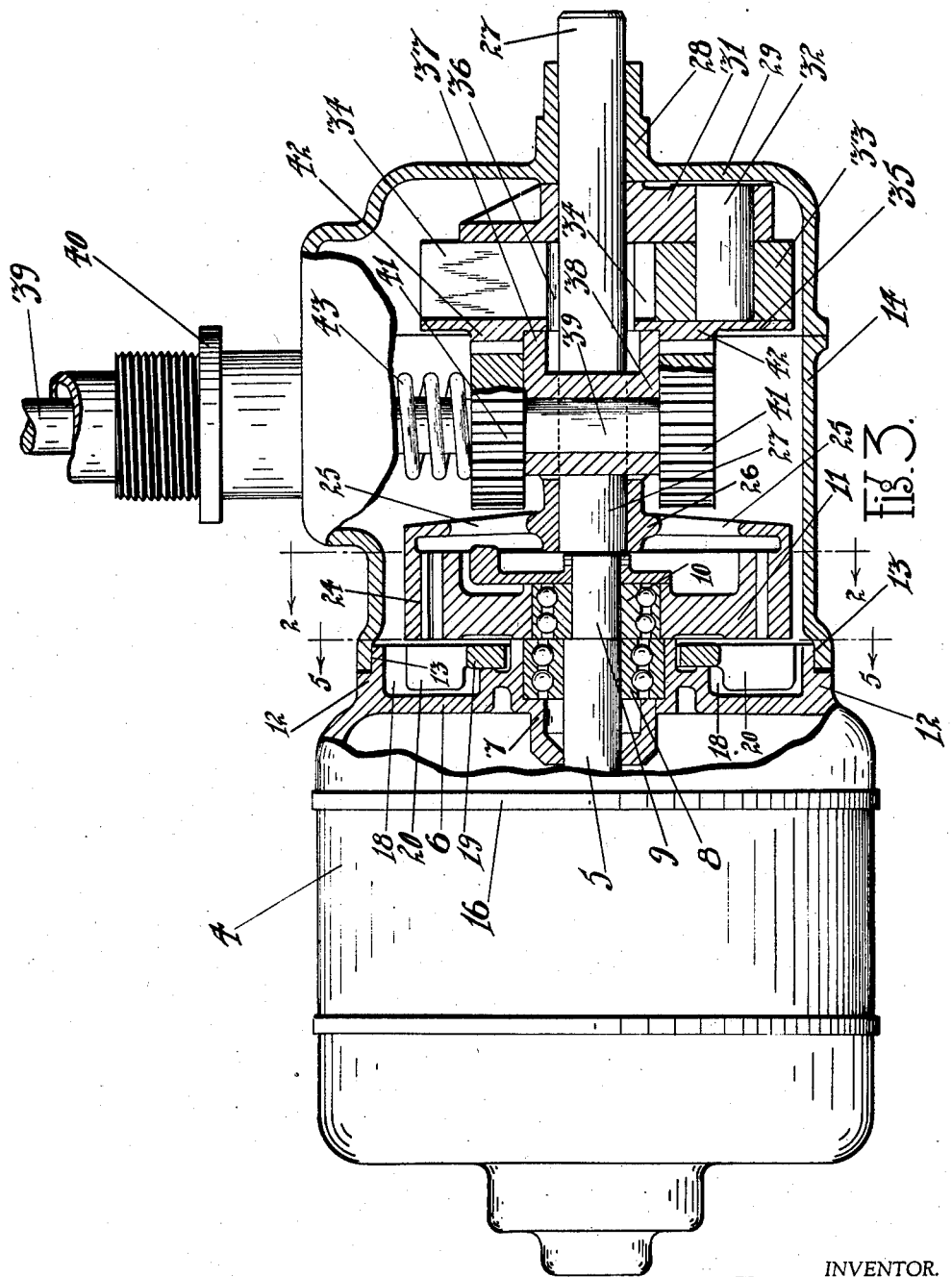
INVENTOR.
THOMAS W. BEHAN.
BY
ATTORNEY.

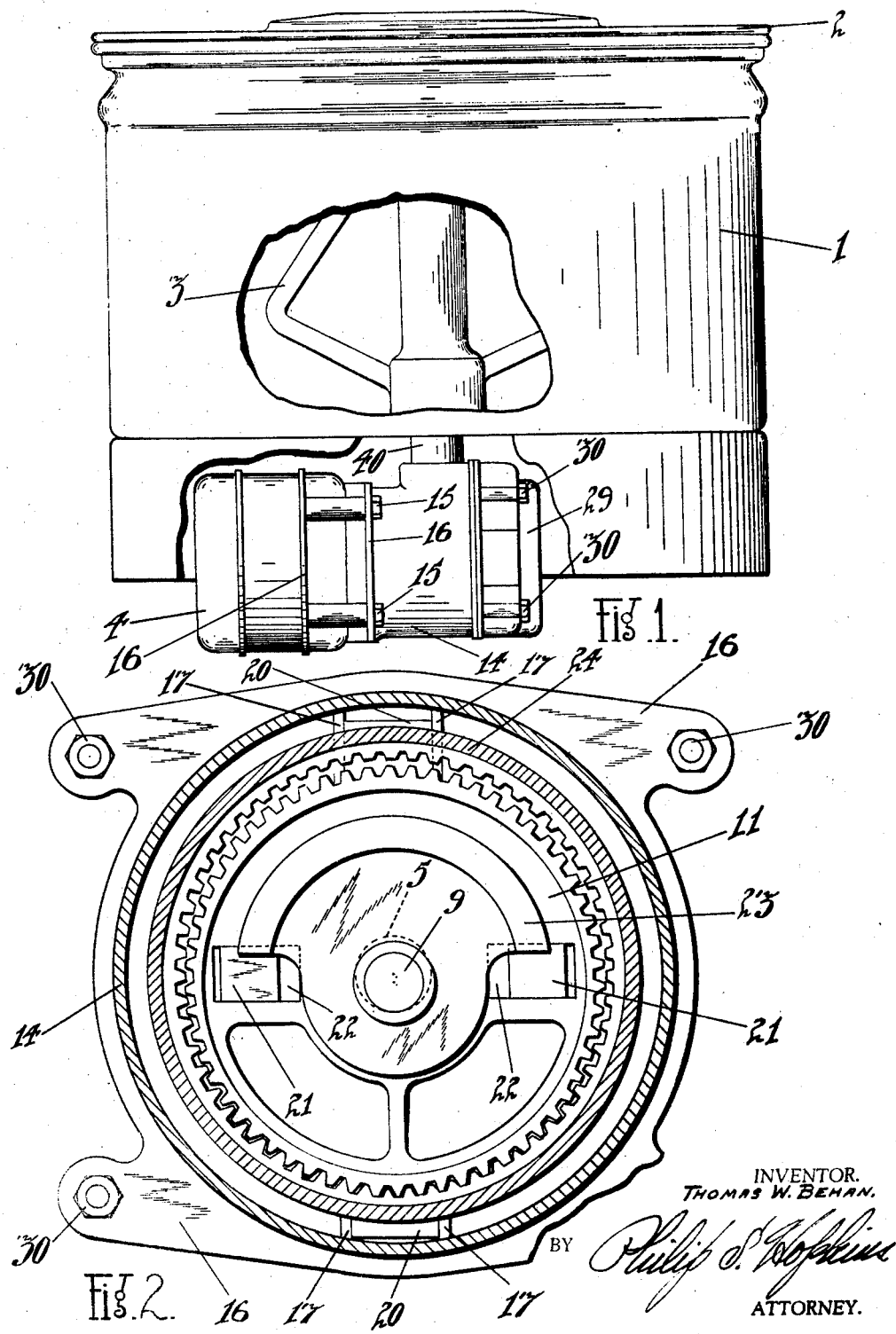

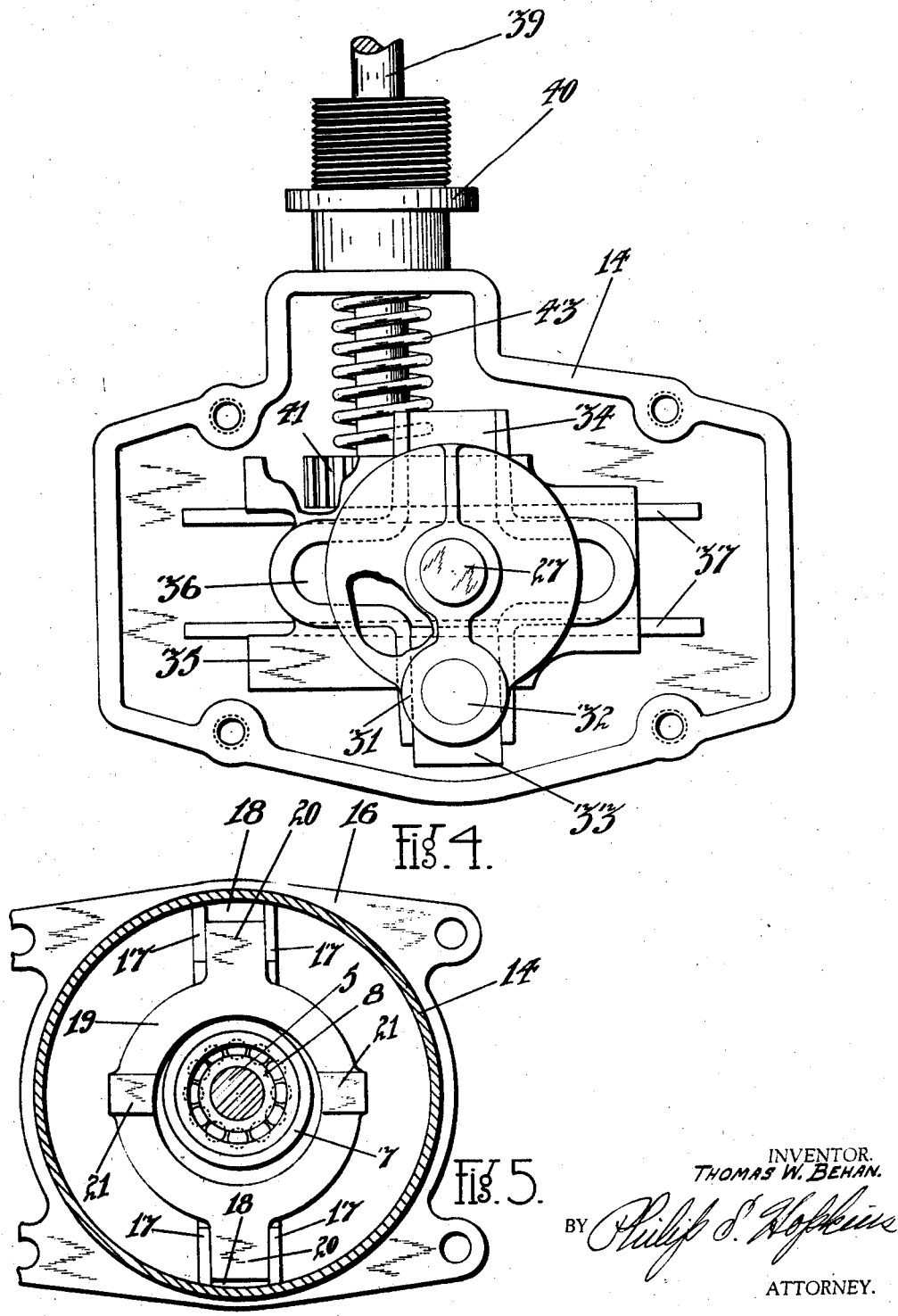

Patented July 13, 1937

2,086,931

UNITED STATES PATENT OFFICE 2,086,931

SPEED REDUCTION AND MOTION TRANSLATING MECHANISM

Thomas W. Behan, Binghamton, N. Y.

Application December 1, 1934, Serial No. 755,626

1 Claim. (Cl. 74—78)

My invention relates to a speed reduction and motion translating mechanism and has for its principal object the provision of a means whereby the relatively high speed of rotation of a motor shaft may be transmitted at a very much reduced speed and translated into relatively slow oscillations.

My invention has particular application as a driving mechanism for washing machines although, as will be apparent as the description proceeds, it is by no means limited to that use. Inasmuch as the problems of a washing machine drive are typical of the problems in many arts wherein a motor drive, a speed reduction, and a translation of motion are required, this application of my invention will serve to aptly illustrate its usefulness.

In providing a driving mechanism for a washing machine or the like, an electric motor is used of a sufficient size and power to adequately carry the heavy load incident to oscillating an agitator within the machine against the action of a tub full of water and heavy clothes. Such a motor generally turns its shaft at a speed of about 1800 R. P. M. Obviously, for effective operation, the speed of this shaft must be reduced and stepped down very materially and then the rotation of such shaft translated into delivered oscillating movement for the agitator. Heretofore, and in practical and common use today, the mechanism for reducing the speed of the motor shaft from 1800 R. P. M. down to the required 60 R. P. M., has comprised a worm cut upon the motor shaft with which meshes a worm gear whereby the required speed reduction is obtained. It is obvious, of course, that the use of conventional speed reduction mechanism comprising gears and pinions stepping down the speed gradually from the motor shaft, would be too expensive and require entirely too much space for practical purposes. While the use of the conventional worm and worm gear speed reduction reduces somewhat the space required to a practical size, this means also has objections and disadvantages.

In the first place, the worm and worm gear speed reduction means is very expensive in that the cutting of both the worm and worm gear is a precision job requiring the utmost accuracy and care and necessitating expensive machinery which will make the required cuts to within a fraction of a thousandth of an inch of perfection. That this is a difficult and expensive task is more evident when it is realized that the worm and worm gear must, after being cut, be hardened and still retain the accuracy referred to. Furthermore, with this type of speed reduction mechanism there is constant wear between the teeth of the worm and worm gear, necessitating cumbersome and inconvenient means for adjustment in order to periodically take up the slack and compensate for such wear in order to maintain a quiet and smooth running mechanism.

In addition to these objections it has been found by actual practice and experience that the customary direct translation of movement from the rotation of the worm gear to the oscillation of the agitator places a tremendous load upon the delicate worm and worm gear which is conducive to short life and less efficient operation.

By my invention I have provided a mechanism which eliminates the difficulties and disadvantages of the driving means in common use and have provided a very simple, inexpensive and efficient driving mechanism which does not require the precision work and accuracy of the worm and worm gear and which occupies a minimum amount of space thereby lending itself admirably to such uses as for driving a washing machine.

By my invention I provide a direct speed reduction from the motor shaft to the required driving speed. This reduced rotary movement is then converted into a reciprocating motion and this in turn translated into oscillating motion for the agitator. No adjustments for wear are necessary and no expensive machines or parts, comparable to those necessary for the worm and worm gear mechanism, are required.

Other objects and advantages will be apparent as the description proceeds, reference now being had to the figures of the accompanying drawings forming a part of this application and wherein like reference numerals indicate like parts.

In the drawings:

Figure 1 is a side view of a washing machine tub with my improved drive mounted thereon, certain parts being broken away for clearness of illustration.

Figure 2 is a cross sectional view illustrating the speed reduction mechanism, the figure being taken on the line 2—2 of Figure 3.

Figure 3 is a side view of my driving mechanism, certain parts being broken away and others shown in section for clearness of illustration.

Figure 4 is an end view of my device with the end cover removed to show the motion translating mechanism.

Figure 5 is a detail sectional view taken on the line 5—5 of Figure 3.

The reference character 1 indicates a conventional tub of a washing machine provided with a cover 2 and within which tub is disposed an agitator 3 adapted to oscillate therein for the purpose of agitating water and to turn the clothes during the washing operation.

Suitably mounted and disposed beneath the tub 1 is provided my improved driving mechanism which will now be described.

The source of power of my improved mechanism comprises an electric motor 4 of such size and power as to cause the motor shaft 5 to rotate at say 1800 R. P. M. The front 6 of the motor housing is provided with a suitable bearing 7 through which the motor shaft 5 extends and within which it is journaled in the ball or roller bearing 8. The extreme end 9 of the motor shaft 5 projects beyond the bearing 8 and is provided eccentric to the shaft 5. This eccentric end 9 of the shaft is journalled in a ball or roller bearing 10, disposed concentrically within a toothed pinion 11.

The inner end of the motor casing is provided with a circumferential flange 12 shouldered exteriorly as at 13 to receive the adjacent end of a casing 14 adapted to house the pinion 11 and the speed reduction and motion translating mechanism. Any suitable means may be provided for rigidly securing the motor casing and the housing 14 together, such as the bolts 15 shown in Figure 1, passing through flanges 16 provided on the two casings.

Referring again to Figure 3 and also to Figure 5, it will be noted that within the circumferential flange 12 there are provided oppositely disposed ribs 17 forming recess guides 18. Loosely mounted around the bearing 7 and the roller bearing 8 is a guide yoke 19 in the form of a flat ring encircling such bearing 7. This guide yoke 19 is provided with guide lugs or shoes 20 projecting into the recesses 18 and engaging between the ribs 17 with a close sliding fit.

At opposite points on the guiding yoke 19 and disposed at right angles to the shoes 20 are guide lugs or shoes 21 (see Figures 2 and 5), projecting in the opposite direction from the shoes 20. The pinion 11 is provided with oppositely disposed guide slots or recesses 22 into which the lugs or shoes 21 engage and within which they have a close sliding fit. It will thus be seen that the guide yoke 19 may slide back and forth in one direction guided by the lugs or shoes 20 in the recesses 18. Obviously the pinion 11 may also move in the same direction with the yoke by virtue of the lugs 21 engaging in the slots 22 of the pinion. Likewise the pinion 11 may move in a direction at right angles thereto, with the yoke 19, following the outward throw of the eccentric 9 upon which the pinion is mounted, by virtue of the guide shoes 21 sliding within the slots 22.

It will be clear from this arrangement that the pinion 11 is not rotatable but that it may oscillate upon rotation of the motor shaft and that such oscillation is produced by the outward throw of the eccentric 9 upon which the pinion is mounted.

Suitably secured upon the eccentric 9 is a control balance 23 so positioned as to offset the eccentric 9 and thus counter-balance the shaft 5 with the eccentric, and thus providing for a smooth and balanced rotation thereof.

Encircling the pinion 11 is an internally toothed gear wheel 24 provided with a greater number of teeth than the pinion 11. For instance, the piston 11 may have 58 teeth and the internal gear 60 teeth although this ratio may vary considerably in accordance with the speed reduction desired. The internal gear 24 is provided with an offset web 25 terminating in a central hub 26 concentric with the motor shaft 5. This hub is suitably secured to one end of a shaft 27 suitably journaled within the casing 14, the opposite end of the shaft being rotatably supported in a bearing 28 provided in the removable closure cap 29 of the casing 14 suitably secured to the casing as by the bolts 30 (see Figure 1).

It will be clear now that rotation of the motor shaft 5 and of the eccentric end 9 thereof results in a rapid oscillation of the pinion 11 which in its oscillating movement continuously moves into meshing engagement with the teeth of the internal gear 24, the meshing engagement being a rolling one and due to the difference in the number of teeth on the pinion and in the gear, the gear 24 is caused to rotate at a very materially reduced rate of speed from that of the motor shaft 5. As a matter of fact the 1800 R. P. M. of the motor shaft is thus directly reduced to 60 R. P. M. in the gear 24 and consequently in the shaft 27.

Secured upon the shaft 27 is a crank arm 31 carrying a pin 32 upon which is mounted a shoe 33 slidably disposed within a slot 34 provided in a carriage 35. This carriage 35 is also slotted transversely as at 36 in alignment with the shaft 27 so as to permit free sliding movement of the carriage when the crank arm 31 is rotated and the shoe 33 acting within the slot 34 of the carriage causes reciprocation of the carriage along guides 37. The guides 37 may, as shown clearly in Figure 3, comprise part of a centrally disposed journal 38 within the casing 14 within which is vertically disposed an oscillatable shaft 39 extending upwardly through the top of the casing 14 and through a suitable threaded extension 40 providing means for securing the device to the underside of the tub 1. The shaft 39 extends into the tub 1 and has suitable driving connection (not shown) with the agitator 3.

Suitably secured upon the shaft 39 is a pair of spaced pinions 41 with which engage the toothed racks 42 provided upon the adjacent side of the carriage 35. A coil spring 43 encircles the shaft 29 within the casing 14 above the upper pinion 41. This spring merely serves to retain the proper packing pressure in the extension 40.

It will be apparent that upon rotation of the crank arm 31, the shoe 33 carried thereby will slide within the slot 34 on the carriage and cause the carriage to reciprocate on the guides 37. This reciprocation will, through the racks 42 and pinions 41, produce an oscillating movement of the shaft 39 which is communicated to the agitator 3.

From the foregoing it will be clear that I have provided a very simple and inexpensive driving mechanism for the agitator of a washing machine and the like in which few parts are necessary and by which the high speed of the motor is directly reduced without the use of expensive and precision mechanism and that such reduced speed is then translated from rotary motion first into reciprocating motion and then into oscillating motion. The mechanism is particularly distinguished by the fact that it requires a minimum of space, that it may be sealed up in oil for indefinite operation without necessity of adjustment, and yet may be easily and quickly assembled or torn down as the occasion requires. In addition, the mechanism provides a quiet smooth running means for the purpose required.

One important feature of the invention just described is that because of its simplicity and few parts, the weight of it is at least 25% less than the ordinary conventional type of power and speed reduction mechanisms for washing machines and the like. This is of tremendous value from the standpoint of portability and the cost of transportation.

Of course, changes may be made in details of construction and arrangement of parts without departing from the spirit and scope of my invention. I do not limit myself, therefore, to the exact form herein shown and described other than by the appended claim.

I claim:

In combination, an electric motor and shaft, a casing into which said shaft extends, a second shaft in said casing, an internal eccentric planetary speed reduction mechanism in said casing driving said second shaft at reduced speed from said motor shaft, means in said casing and driven by said second shaft for converting the rotation thereof into delivered oscillations, said means including a crank arm rotatable with said second shaft, a carriage reciprocated thereby, and a third shaft having rack and pinion connection with said carriage whereby the reciprocations thereof produce oscillations in said third shaft, said third shaft extending out of said casing for delivering said oscillations.

THOMAS W. BEHAN.